US008847130B2

(12) United States Patent
Niwa et al.

(10) Patent No.: US 8,847,130 B2
(45) Date of Patent: Sep. 30, 2014

(54) HEATING UNIT OF VEHICLE HEATING SYSTEM

(75) Inventors: Norio Niwa, Nagoaya (JP); Ryousei Noda, Nagoya (JP); Hiroki Anzai, Tsuruoka (JP)

(73) Assignees: Kabushiki-Kaisha TAKUMI, Nagoya-shi (JP); Kabushiki-Kaisha Lead Industry, Tokyo (JP)

( * ) Notice: Subject to any disclaimer, the term of this patent is extended or adjusted under 35 U.S.C. 154(b) by 690 days.

(21) Appl. No.: 13/103,153

(22) Filed: May 9, 2011

(65) Prior Publication Data

US 2012/0285949 A1 Nov. 15, 2012

(51) Int. Cl.

| | |
|---|---|
| ***H05B 6/80*** | (2006.01) |
| ***H05B 6/64*** | (2006.01) |
| ***H05B 6/70*** | (2006.01) |
| ***H05B 6/66*** | (2006.01) |
| ***H05B 6/50*** | (2006.01) |
| ***B60H 1/03*** | (2006.01) |
| ***B60H 1/02*** | (2006.01) |
| ***B60H 1/00*** | (2006.01) |
| ***B61D 27/00*** | (2006.01) |
| ***F24F 7/00*** | (2006.01) |
| ***F24D 5/00*** | (2006.01) |

(52) U.S. Cl.

CPC ...................................... *H05B 6/802* (2013.01)

USPC ........... 219/687; 219/678; 219/679; 219/680; 219/681; 219/682; 219/683; 219/684; 219/688; 219/690; 219/691; 219/703; 219/707; 219/709; 123/142.5 E; 123/142.5 R; 237/12.1; 237/12.2; 237/12.3 R; 237/12.3 A; 237/12.3 C; 237/12.4; 237/12.5; 237/12.6; 237/12.7; 237/12.8; 237/46; 237/47; 237/48; 237/49; 237/50; 237/51; 237/52; 165/41; 165/42; 137/341; 392/479

(58) Field of Classification Search

USPC ................. 219/678–684, 687–688, 690–691, 219/702–703, 707, 709, 201, 202, 205, 206, 219/208; 123/142.5 E, 142.5 R; 237/12.1–12.8, 46–52; 165/41, 42; 137/341; 392/479

See application file for complete search history.

(56) References Cited

U.S. PATENT DOCUMENTS

| | | | | |
|---|---|---|---|---|
| 3,816,689 | A * | 6/1974 | Long | 219/687 |
| 4,114,011 | A * | 9/1978 | Stubbs | 219/688 |
| 4,152,567 | A * | 5/1979 | Mayfield | 219/688 |

(Continued)

FOREIGN PATENT DOCUMENTS

JP 2008-013115 A 1/2008

*Primary Examiner* — Dana Ross
*Assistant Examiner* — Gyounghyun Bae
(74) *Attorney, Agent, or Firm* — Holtz Holtz Goodman & Chick PC

(57) ABSTRACT

A heating unit can reduce the rate of power consumption for heating a vehicle, so that the running distance of the vehicle is increased and hence the battery charging cycle of the vehicle is prolonged. A heating unit of a vehicle heating system includes a casing made of a metal material capable of electromagnetically shielding microwaves, a support arranged in the hollow section of the casing, a plurality of microwave absorbing/heat emitting members arranged at the support and a microwave outputting unit arranged in the casing to output microwaves toward respective microwave absorbing/heat emitting members, blown air being heated by heat generated as a result of absorption of microwaves by the microwave absorbing/heat emitting members at the time for blown air to flow from the upstream side to the downstream side in the hollow sections of the microwave absorbing/heat emitting members.

11 Claims, 7 Drawing Sheets

(56) References Cited

U.S. PATENT DOCUMENTS

| | | | | | |
|---|---|---|---|---|---|
| 4,319,856 | A | * | 3/1982 | Jeppson | 404/79 |
| 4,542,980 | A | * | 9/1985 | Tajima | 399/336 |
| 4,956,534 | A | * | 9/1990 | Martin | 219/687 |
| 5,073,167 | A | * | 12/1991 | Carr et al. | 604/114 |
| 5,235,296 | A | * | 8/1993 | Saka | 333/109 |
| 5,420,401 | A | * | 5/1995 | Jacquault et al. | 219/756 |
| 5,451,751 | A | * | 9/1995 | Takimoto et al. | 219/746 |
| 5,525,782 | A | * | 6/1996 | Yoneno et al. | 219/682 |
| 5,568,765 | A | * | 10/1996 | Andoh et al. | 99/403 |
| 5,683,381 | A | * | 11/1997 | Carr et al. | 606/27 |
| 5,690,852 | A | * | 11/1997 | Saito et al. | 219/725 |
| 6,271,509 | B1 | * | 8/2001 | Dalton | 219/687 |
| 6,472,648 | B2 | * | 10/2002 | Matsuo et al. | 219/688 |
| 6,572,830 | B1 | * | 6/2003 | Burdon et al. | 422/186.29 |
| 6,825,451 | B1 | * | 11/2004 | Deangelis | 219/679 |
| 6,967,315 | B2 | * | 11/2005 | Centanni et al. | 219/628 |
| 7,138,615 | B1 | * | 11/2006 | Williamson et al. | 219/679 |
| 7,166,819 | B2 | * | 1/2007 | Winter et al. | 219/202 |
| 7,420,500 | B2 | * | 9/2008 | Treen et al. | 342/4 |
| 2005/0072776 | A1 | * | 4/2005 | Doh et al. | 219/682 |
| 2005/0211705 | A1 | * | 9/2005 | Nomura et al. | 219/759 |
| 2008/0087662 | A1 | * | 4/2008 | Takizaki et al. | 219/678 |
| 2010/0051612 | A1 | * | 3/2010 | Fagrell et al. | 219/748 |
| 2010/0116821 | A1 | * | 5/2010 | Niwa et al. | 219/690 |

* cited by examiner

HEATING UNIT OF VEHICLE HEATING SYSTEM

BACKGROUND OF THE INVENTION

1. Field of the Invention

The present invention relates to a heating unit of a vehicle heating system. More particularly, the present invention relates to a heating unit for heating blowing air at a low power consumption rate by arranging microwave absorbing/heat emitting members that absorb microwaves and emit heat in a vehicle air conditioning unit or in a vehicle air duct.

2. Prior Art

Various hybrid vehicles and electric vehicles have been proposed and developed for the purpose of improving the fuel efficiency of vehicles and reducing the quantity of $CO_2$ gas emissions from vehicles in recent years. Such vehicles, electric vehicles in particular, are equipped with an electric motor that is operated by electric power supplied from the battery mounted in the vehicle when driving the vehicle by means of the electric motor. Then, electric power is consumed at a high rate to give rise to a problem of a short cruising distance. The cruising distance can be increased by raising the capacity of the battery mounted in the vehicle. However, the vehicle weight will be raised accordingly to by turn lower the power consumption efficiency and reduce the cruising distance of the vehicle. Therefore, the battery needs to be charged frequently.

Thus, in hybrid vehicles and electric vehicles, the electric power consumption rate of other than the electric equipment for driving the vehicle and securing the safety of the running vehicle needs to be minimized. For instance, Patent Document 1 proposes a vehicle air conditioning system that is operated by using a technique developed for reducing the power consumption rate of a vehicle air conditioning system.

A vehicle air conditioning system as illustrated in Patent Document 1 employs a PTC heater (positive temperature coefficient heater) formed by arranging a large number of PTC thermistors as heating members in a vehicle air conditioning unit and the system includes an excess power data acquisition means for determining the excess power in a vehicle that can be supplied to a PTC heater and a power consumption data acquisition means for determining the power consumption rate of the FTC heater that changes as a function of the temperature of the PTC thermistors. The power consumption rate of the vehicle in a heating operation is reduced by controlling the PTC thermistors on the basis of the excess power as determined by the excess power acquisition means and the power consumption rate as determined by the power consumption data acquisition means.

A PTC heater is a heater having a characteristic that its power consumption rate is reduced as its temperature rises but it is accompanied by a problem of consuming power at a high rate in a situation where the air conditioning temperature of the vehicle in which it is mounted and hence the temperature of the PTC heater itself is not high. Such a situation can be observed when the ambient temperature is low or when the vehicle is in the initial stages of a running operation. Particularly, when such a PTC heater is mounted in an electric vehicle, all the energy for driving the vehicle to run depends on one or more batteries so that, as the power consumption rate of the vehicle air conditioning system rises, the running distance of the vehicle is reduced and hence the battery charging cycle of the vehicle becomes short.

PRIOR ART DOCUMENT

Patent Document

[Patent Document 1] Jpn. Pat. Appln. Laid-Open Publication No. 2008-13115

Therefore, the problem to be solved by the present invention is that the prior art requires a high power consumption rate for vehicle air conditioning, vehicle heating in particular, so that the running distance of the vehicle is reduced and hence the battery charging cycle of the vehicle becomes short.

SUMMARY OF THE INVENTION

According to the present invention, there is provided a heating unit of a vehicle heating system arranged in a blown air flow path for either internal air or external air to be blown into the inside of a vehicle in order to heat blown air, the heating unit including:

a casing made of a metal material capable of electromagnetically shielding microwaves and arranged in the blown air flow path, the casing having a hollow section with an upstream side opening and a downstream side opening as viewed in the flow direction of blown air so as to allow blown air to flow in and out therethrough;

a support arranged in the hollow section of the casing;

a large number of microwave absorbing/heat emitting members arranged at the support at appropriate intervals, each having a hollow section with an upstream side opening and a downstream side opening at the opposite ends of the support as viewed in the air blowing direction; and a microwave outputting means arranged in the casing to output microwaves toward respective microwave absorbing/heat emitting members;

blown air being heated by heat generated as a result of absorption of microwaves by the microwave absorbing/heat emitting members at the time for blown air to flow from the upstream side to the downstream side in the hollow sections of the microwave absorbing/heating emitting members.

Thus, the present invention can reduce the rate of power consumption rate for heating a vehicle, so that the running distance of the vehicle is increased and hence the battery charging cycle of the vehicle is prolonged.

DESCRIPTION OF THE PREFERRED EMBODIMENTS

In the best mode of carrying out the present invention, blown air that is at least either internal air or external air is heated by heat generated as a result of absorption of microwaves by the microwave absorbing/heat emitting members at the time for blown air to flow through the hollow sections of the microwave absorbing/heating emitting members.

Embodiment 1

Now, an embodiment of vehicle heating system according to the present invention that is arranged in an air conditioning unit will be described below by referring to the related drawings.

Figure 1:
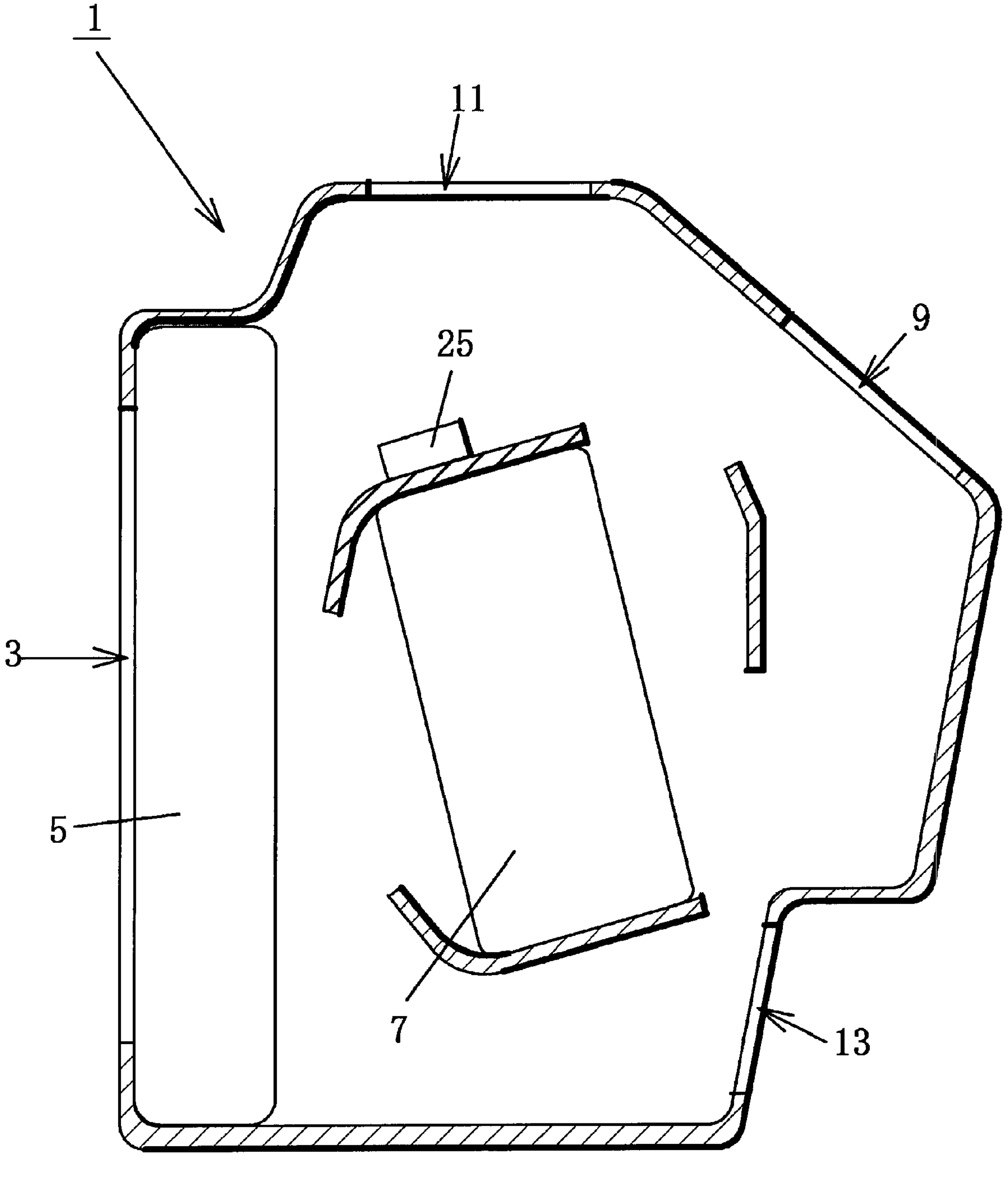
FIG. 1 is a schematic cross-sectional view of the first embodiment of air conditioning unit of a vehicle air conditioning system.
Figure 2:
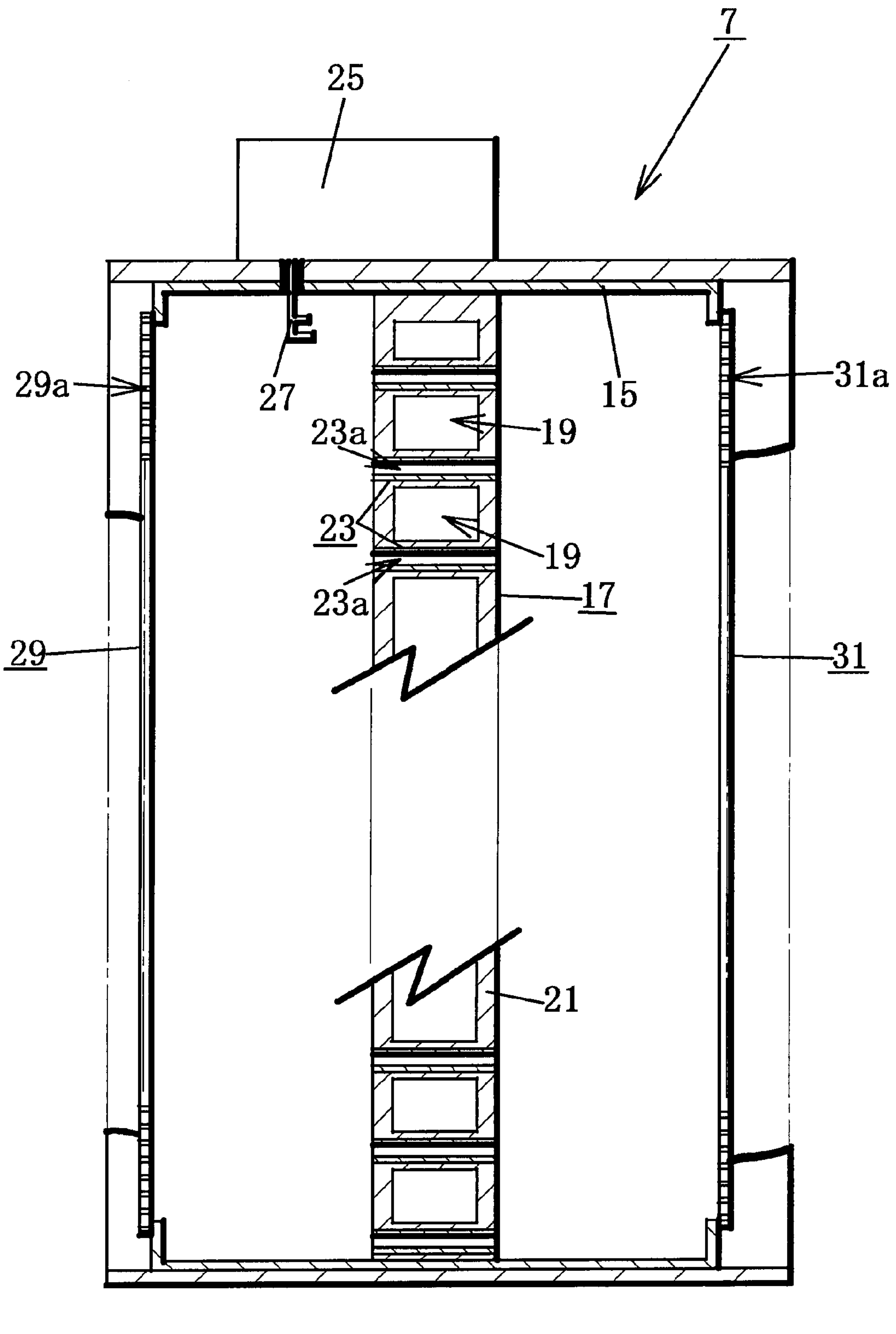
FIG. 2 is a schematic cross-sectional view of the heating unit of the first embodiment.
Figure 3:
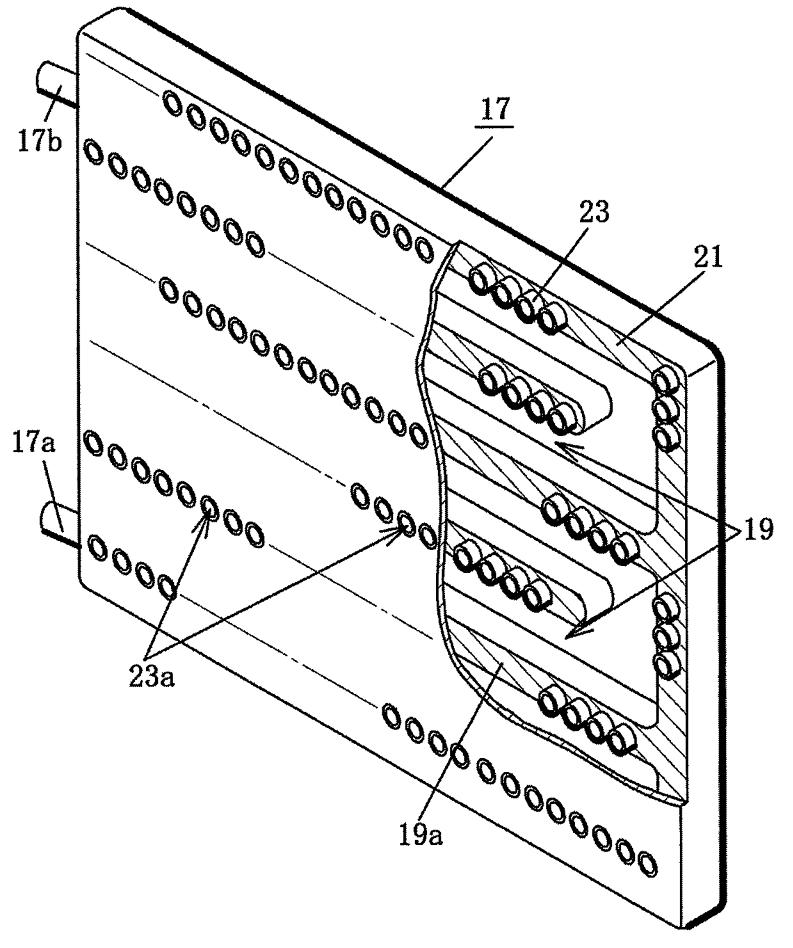
FIG. 3 is a partly cut out perspective view of the heater core of the first embodiment.

FIGS. 1 through 3 schematically illustrate the first embodiment of the present invention that is an exemplar vehicle air conditioning system for hybrid vehicles. Air conditioning unit 1 of the air conditioning system is arranged below an instrument panel in a vehicle and blown air that is at least internal air or external air taken in by way of an internal air/external air switching door (which blown air may be a mixture of internal air and external air) as a blower fan (not shown) is driven to rotate is blown into the air conditioning unit 1 by way of an air intake port 3. The air blown into the air conditioning unit 1 is cooled as it passes an evaporator 5 and subsequently passes and/or bypasses heating unit 7 of the vehicle heating system at a ratio corresponding to the degree of opening of an air mixing door to produce an air conditioning breeze of a predetermined temperature. The air conditioning breeze flows out from the air conditioning unit 1 by way of a blowout door showing a degree of opening and closing corresponding to the selected blowout mode and blown into the vehicle by way of a duct.

In the drawings, reference symbol 9 denotes a ventilation port for blowing air toward the rider (s) from a ventilation blowout port in a ventilation mode and reference symbol 11 denotes a defrost port for blowing air toward the inner sides of the vehicle windows from a defrost blowout port in a defrost mode, while reference symbol 13 denotes a foot port for blowing air toward the feet of the rider (s) from a foot blowout port in a foot mode. Doors that are opened and closed for blowing air are provided in the air conditioning unit 1 respectively on the ways down to the ports 9, 11 and 13, but are omitted from the drawings.

The casing 15 of the heating unit 7 of the above-described vehicle heating system is cylinder- or polygonal tube-shaped and made of a metal material such as stainless steel or aluminum that reflects microwaves as will be described in greater detail hereinafter. A heater core 17 is arranged orthogonally relative to the air blowing direction at a middle section of the inside of the casing 15 as viewed in the air blowing direction. The heater core 17 includes a support 21 having a multiply-folded cooling water flow path 19 formed in the inside thereof so as to allow cooling water to flow therethrough and a large number of pipe-shaped microwave absorbing/heat emitting members 23 arranged side by side and supported by the inner wall of the support 21 and the partition walls of the cooling water flow path 19, each having a hollow section 23*a* whose axially opposite ends are open at the upstream side and at the downstream side as viewed in the air blowing direction from the support 21.

Engine cooling water is made to circulate through the cooling water flow path 19 in the inside of the heater core 17. It is heated by the heating effect of the microwave absorbing/heat emitting members 23 when the ambient air is cold or when the engine is started, whereas it heats the microwave absorbing/heat emitting members 23 to by turn heat the flowing blown air when its temperature has risen. In the drawings, reference symbol 17*a* denotes a cooling water intake port and reference symbol 17*b* denotes a cooling water discharge port.

The support 21 is made of a magnetically permeable ceramics material or a heat-resistant synthetic resin material that transmits microwaves in the microwave frequency band (from 2 to 10 GHz). The microwave absorbing/heat emitting members 23 are made of an electromagnetic wave absorbing material having microwave absorbing characteristics such as ferrite, Permalloy, oxidized slug or the like. Since the microwave absorbing/heat emitting members 23 are sintered material like the support 21, they can be manufactured by integrally molding and baking them.

When oxidized slug is employed as the electromagnetic wave absorbing material of the microwave absorbing/heat emitting members 23, they can be obtained by mixing powder of oxidized slug with a ceramics material and baking the mixture.

A microwave oscillation unit 25 is fitted to the outside of the casing 15 as part of microwave outputting means. Additionally, an antenna member 27 is fitted to the inside of the casing 15 at a corresponding position which is located upstream in the sense of the air blowing direction of the heater core 17 and connected to the microwave oscillation unit 25 as part of microwave outputting means. The antenna member 27 outputs the microwaves oscillated by the microwave oscillation unit 25 respectively toward the microwave absorbing/heat emitting members 23.

The above-described microwave oscillation unit 25 is formed by a semiconductor microwave oscillator including laser diodes that output microwaves in the microwave frequency band (from 2 to 10 GHz) at an output power level of 50 to 100 W and multistage amplifiers. While microwaves in the 2.45 GHz frequency band allocated to industrial, scientific and medical applications by the Radio Law are preferable, the present invention is by no means limited thereto in terms of frequency and output power level. While magnetrons are generally known as microwave oscillating members, the use of semiconductor microwave oscillators as in the case of this embodiment is preferable because vacuum tubes of magnetrons can be damaged by vibrations and heat with ease.

Microwave shield members 29, 31 are arranged at the respective apertures of the upstream side end and the downstream side end of the casing 15 as viewed in the air blowing direction. The microwave shield members 29, 31 have a large number of openings 29*a*, 31*a* whose sizes are smaller than $\frac{1}{4}\cdot\lambda$ of the microwaves transmitted from the microwave oscillation unit 25 and the microwave shield members 29, 31 are fitted so as to cover the entire openings. The microwave shield members 29, 31 may be formed by using metal plates made of stainless steel of aluminum and punching out the large number of openings 29*a*, 31*a* from them, by using web structures of metal fibers or synthetic resin threads coated by electrically conductive resin that are woven so as to produce the large number of openings 29*a*, 31*a* or by using electrically conductive resin sheets (plates) molded from electrically conductive resin so as to make them show the large number of openings 29*a*, 31*a*.

ON-OFF operations of the above-described microwave oscillation unit 25 are controlled by means of the air temperatures detected by temperature sensors (not shown) arranged near the air blow out port and at the downstream side of the heating unit 7 as viewed in the air blowing direction so as to blow out air at a predetermined temperature. The casing 15 and the microwave shield members 29, 31 are electrically controlled.

Now, the operation of heating blown air by the heating unit 7 of the vehicle heating system having the above-described configuration will be described below.

If the activation switch of the vehicle air conditioning system has already been turned on, the blower fan is driven to rotate and blown air is so directed as to pass through the evaporator 5 and the insides of the microwave absorbing/heat emitting members 23 of the heater core 17 in the heating unit 7 of the air conditioning unit 1 and, at the same time, the microwave oscillation unit 25 is turned on to operate and output microwaves from the antenna member 27 respectively toward the microwave absorbing/heat emitting members 23 as the engine starter of the vehicle is turned on when the ambient air is cold or when the engine is started.

Figure 4:
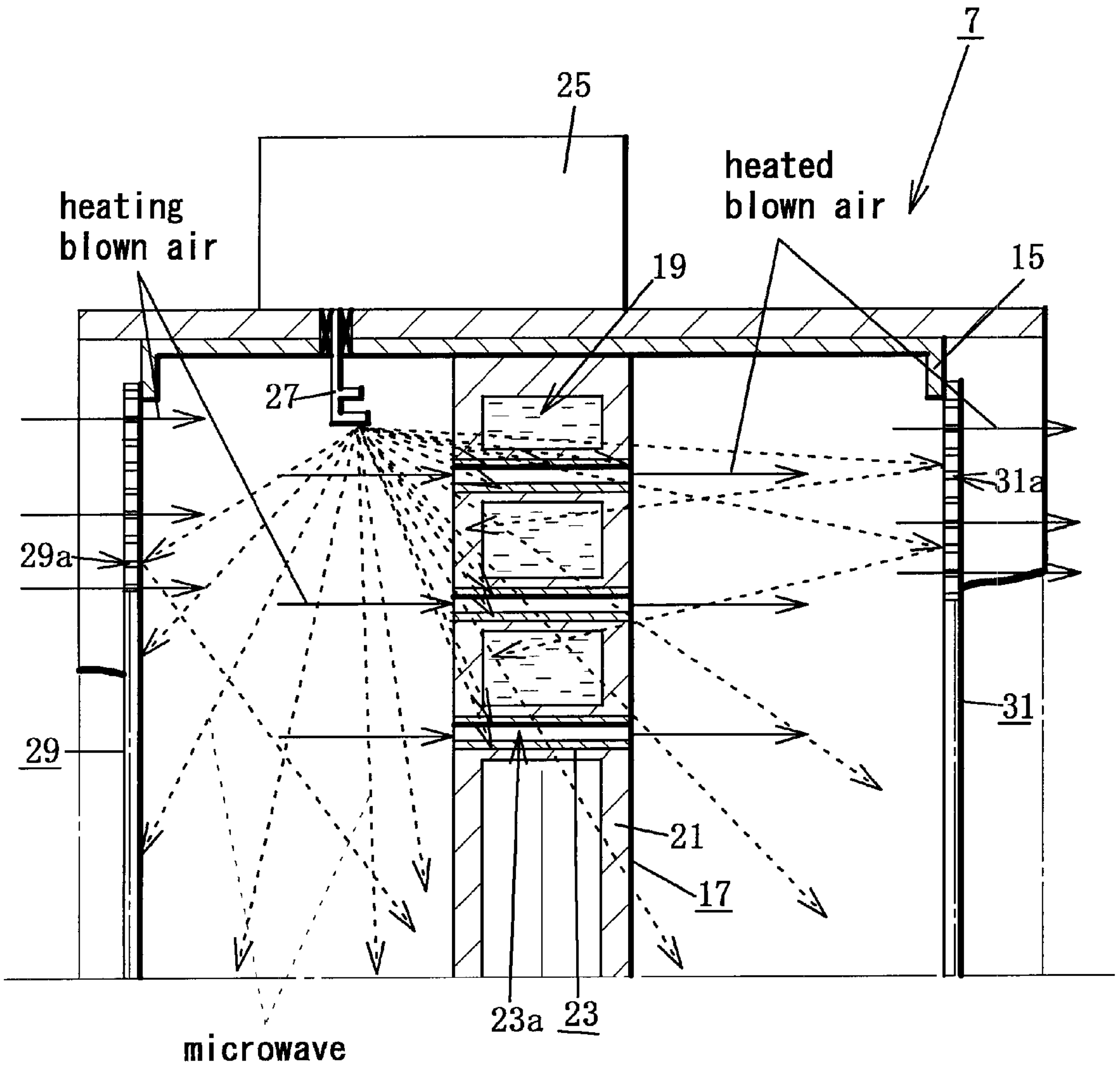
FIG. 4 is a schematic illustration of the heating operation of the first embodiment.

At this time, the microwave absorbing/heat emitting members 23 transform the microwaves transmitted through the support 21 and the microwaves directly output into thermal energy due to a loss of microwaves attributable to the magnetic field and the electric field and absorb the thermal energy. As a result, the microwave absorbing/heat emitting members 23 emit heat and consequently heat the blown air passing through the hollow sections 23*a*. (See FIG. 4)

Note that the microwaves output from the antenna member 27 into the casing 15 are mostly absorbed and transformed into thermal energy by the microwave absorbing/heat emitting members 23 as they are reflected in the casing 15 but part of them may be reflected and directed toward the apertures. However, such microwaves cannot pass through the apertures 29*a*, 31*a* because of the microwave shield members 29, 31 provided in the apertures so that microwaves are prevented from leaking out to the outside. As a result, the electric devices installed in the vehicle are protected against disturbances due to microwaves. The microwave absorbing/heat emitting members 23 that emit heat not only heat blown air but also the cooling water flowing through the cooling water flow path 19 by part of the thermal energy they produce.

When the temperature of the cooling water gets to a level that makes it capable of heating blown air or when the temperature of the air heated by the heating unit 7 and blown into the inside of the vehicle reaches a predetermined level, the microwave oscillation unit 25 is turned off and the blown air heating operation of the heating unit 7 is stopped. When, on the other hand, the temperature of blown air falls below a predetermined level, the microwave oscillation unit 25 is turned on again to heat blown air by means of the heating unit 7.

Table 1 blow shows an example of temperature rise of the microwave absorbing/heat emitting members 23 due to the microwaves output from the microwave oscillation unit 25. In this example, the output power level of the microwave oscillation unit is 100 W and the wavelength of the output microwaves is 2.45 GHz.

TABLE 1

| Output time (sec) | Temperature of microwave absorbing/heat emitting members (° C.) |
|---|---|
| 60 | 152 |
| 90 | 190 |
| 120 | 235 |
| 150 | 261 |
| 180 | 296 |

As seen from the above table, the blown air that passes through the inside of the hollow sections 23*a* of the microwave absorbing/heat emitting members 23 is heated to 75° C. in about 1 minute by the microwave absorbing/heat emitting members 23 that emit heat due to microwaves.

This embodiment can reduce the power consumption rate necessary for heating the inside of a vehicle by heating blown air to a desired temperature level as it employs microwave absorbing/heat emitting members 23 that absorb low output microwaves and emit heat as means for heating blown air.

Embodiment 2

Figure 5:
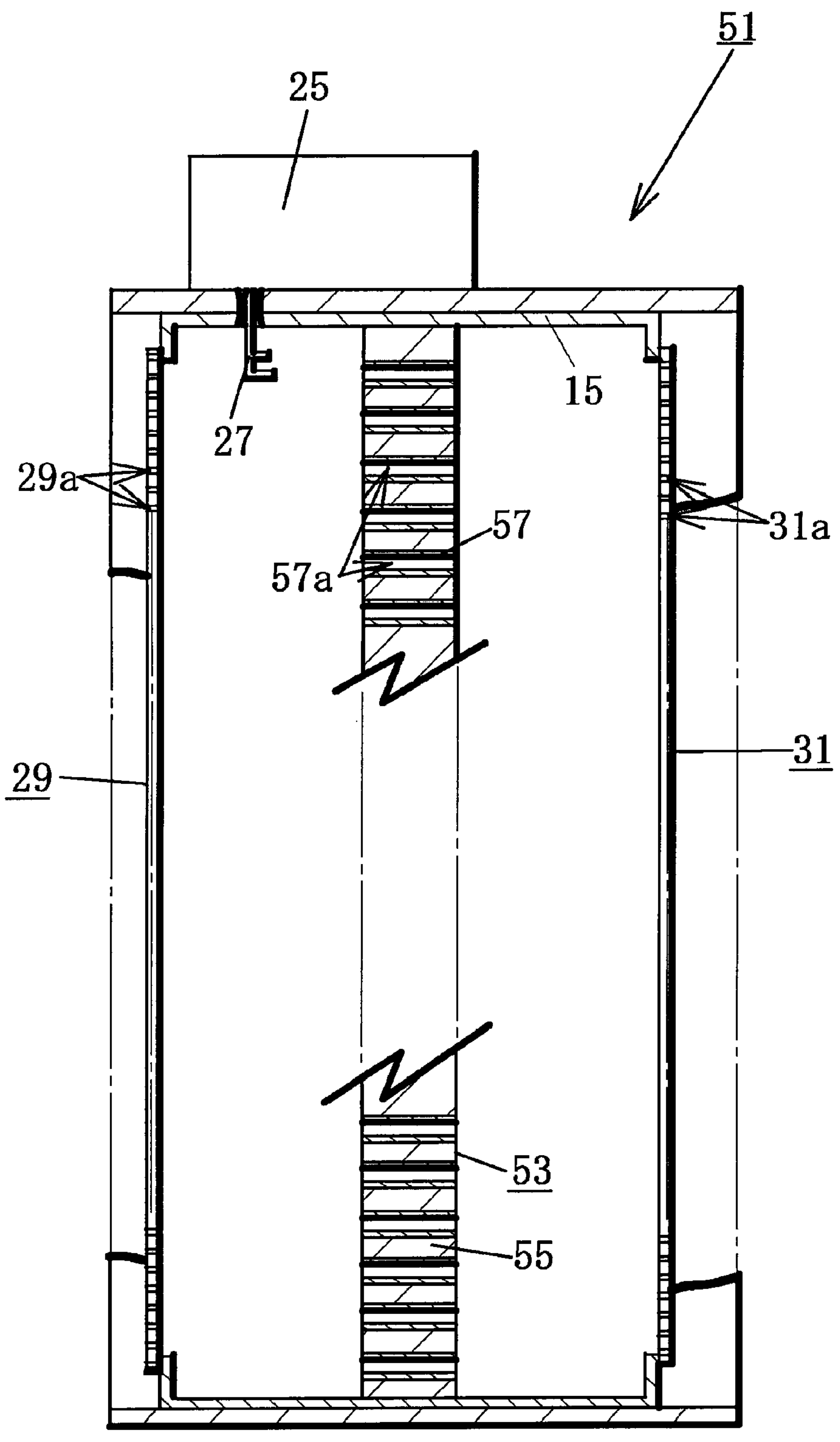
FIG. 5 is a partly cut out schematic cross-sectional view of the second embodiment of heating unit of a vehicle air conditioning system.
Figure 6:
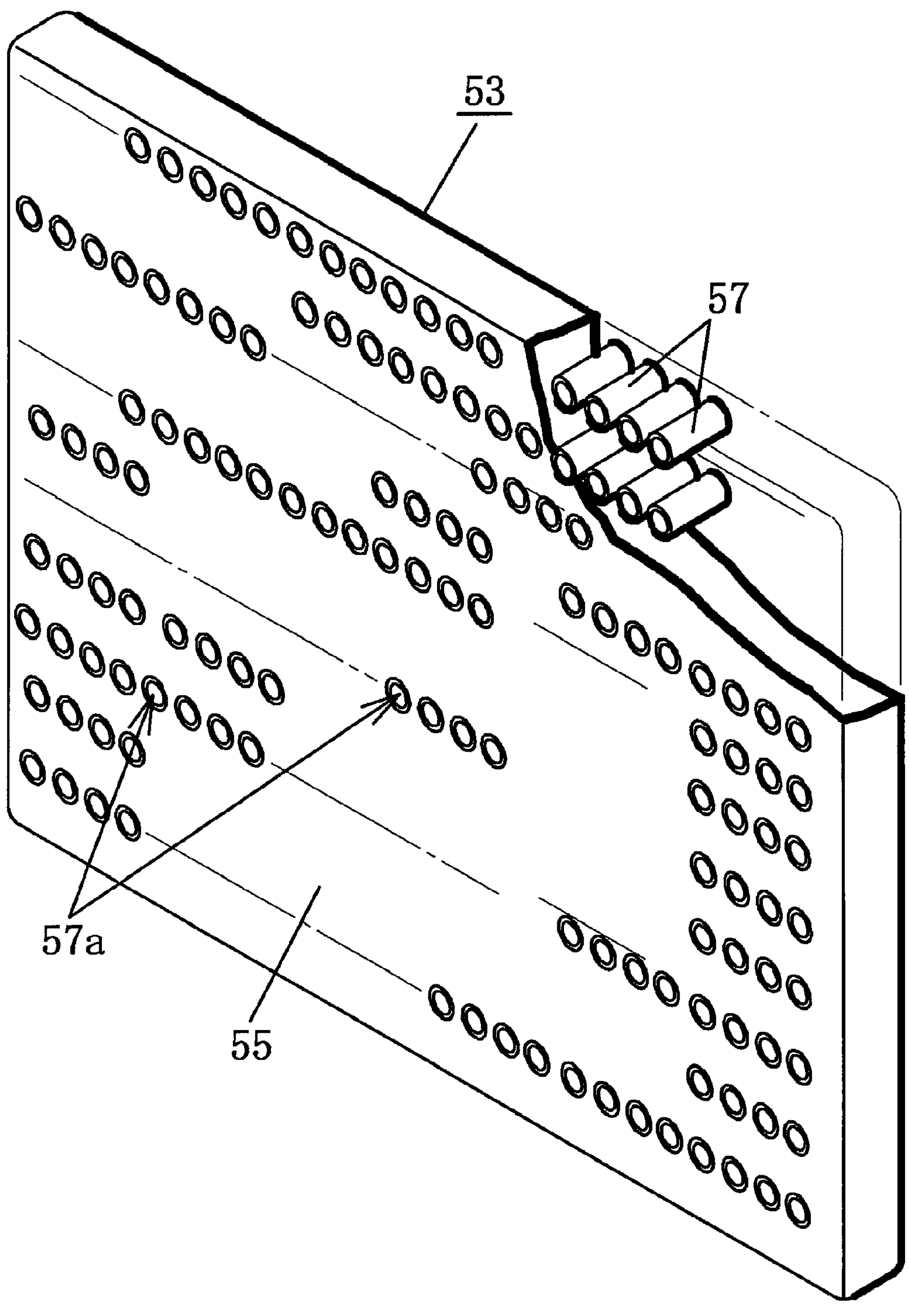
FIG. 6 is a partly cut out perspective view of the heater core of the second embodiment.

FIGS. 5 and 6 illustrate an embodiment of vehicle air conditioning system that is suitable for an electric vehicle or a hybrid vehicle provided with an air-cooled engine. Since this embodiment is the same as Embodiment 1 except that the heater core 53 of the heating unit 51 of this embodiment has a configuration as described below, the components that are same as those of Embodiment 1 are denoted by the same reference symbols and will not be described further in detail.

The heater core 53 is arranged in the casing 15 of the heating unit 51 orthogonally relative to the air blowing direction at a middle section of the inside of the casing 15 as viewed in the air blowing direction. The support 55 of the heater core 53 is formed by using a plate-shaped member that is made of a magnetically permeable ceramics material or a heat-resistant synthetic resin material and large enough for shutting away the space in the casing 15. A large number of pipe-shaped microwave absorbing/heat emitting members 57 are arranged in the support 55 at predetermined intervals both in the longitudinal direction and in the transversal direction. Each of the microwave absorbing/heat emitting members 57 has an axial line extending in the air blowing direction and a hollow section 57*a* disposed at a central section thereof. The microwave absorbing/heat emitting members 57 are made of an electromagnetic wave absorbing material having microwave absorbing characteristics such as ferrite, Permalloy or the like and formed to show a pipe-like profile.

While the illustrated microwave absorbing/heat emitting members 57 are arranged in such a way that one of the opposite ends of each of them agrees with the upstream side surface of the support and the other end agrees with the downstream side surface of the support 55, they may alternatively be so arranged that their axial opposite ends project from the related surfaces of the support 55.

Now, the operation of heating blown air by the heating unit 53 of the vehicle heating system having the above-described configuration will be described below.

If the activation switch of the vehicle air conditioning system has already been turned on, the blower fan is driven to rotate and blown air is so directed as to pass through the evaporator 5 and the insides of the microwave absorbing/heat emitting members 57 of the heater core 53 in the heating unit 51 of the air conditioning unit 50 and, at the same time, the microwave oscillation unit 25 is turned on to operate and output microwaves from the antenna member 27 respectively toward the microwave absorbing/heat emitting members 57 as the engine starter of the vehicle is turned on when the ambient air is cold or when the engine is started.

Figure 7:
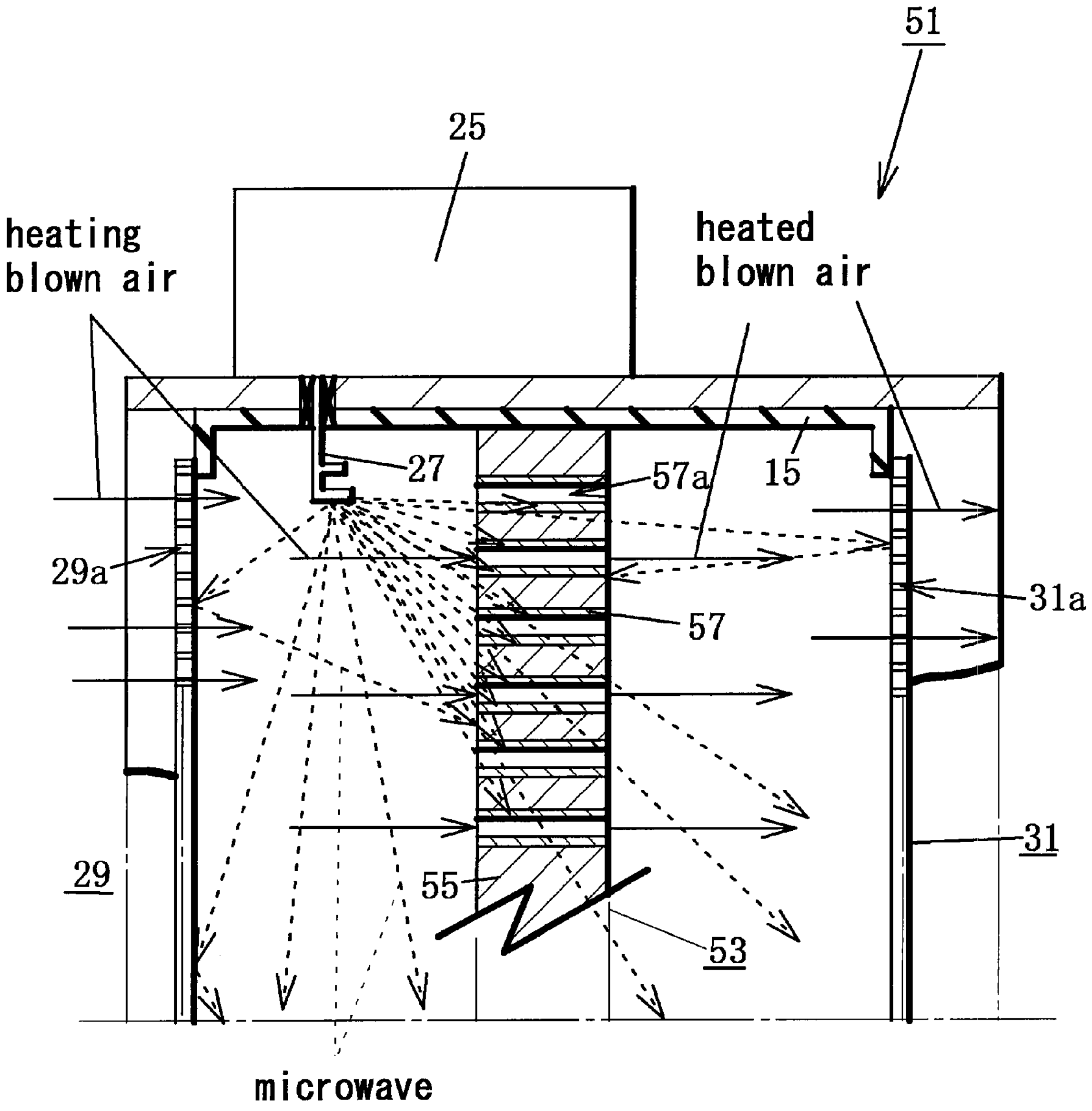
FIG. 7 is a schematic illustration of the heating operation of the second embodiment.

At this time, the microwave absorbing/heat emitting members 57 transform the output microwaves into thermal energy due to a loss of microwaves attributable to the magnetic field and the electric field and absorb the thermal energy. As a result, the microwave absorbing/heat emitting members 57 emit heat and consequently heat the blown air passing through the hollow sections 57*a*. (See FIG. 7)

When the temperature of the air heated by the heating unit 51 and blown out into the inside of the vehicle gets to a predetermined temperature level, the microwave oscillation unit 25 is turned off and the blown air heating operation of the heating unit 51 is stopped according to the signal from the above-described temperature sensor. When, on the other hand, the temperature of blown air falls below a predetermined level, the microwave oscillation unit 25 is turned on again to heat blown air by means of the heating unit 51.

While a heating unit is contained in the air conditioning unit in the above description of Embodiment 1 and Embodiment 2, the place where a heating unit is fitted is by no means limited thereto and a heating unit may alternatively be arranged in part of the fan duct blowing the blown air in the vehicle.

While the supports 21, 55 are made of a magnetically permeable ceramics material or a heat-resistant synthetic resin material in the above description, the support of an air conditioning system according to the present invention may alternatively be formed by using a plate of a metal material such as stainless steel or aluminum. When the support is formed by using a metal plate, fitting holes are bored through the support to receive and securely hold respective microwave absorbing/heat emitting members and the microwave absorbing/heat emitting members are made to project mostly to the side of the microwave outputting means.

With such an arrangement, the microwave absorbing/heat emitting members absorb the directly output microwaves and the microwaves reflected in the inside of the casing and by the support and emit heat to by turn heat the blown air flowing through the hollow sections thereof.

When the microwave absorbing/heat emitting members are fitted to a metal made support, they may be so fitted as to make their ends project to both the upstream side and the downstream side as viewed in the air blowing direction. More specifically, they may be inserted into the respective fitting holes of the support so as to be held there at axial middle sections of the microwave absorbing/heat emitting members and make their ends project to both the upstream side and the downstream side as viewed in the air blowing direction. In such a case, microwave outputting means may be arranged respectively at the upstream side and at the downstream side of the support as viewed in the air blowing direction so as to make the microwave absorbing/heat emitting members that project to the two sides absorb microwaves and emit heat to by turn heat the blown air flowing through the hollow sections thereof.

While a heating unit according to the present invention is to be employed mainly in a heating system of a hybrid vehicle or an electric vehicle in the above description, a heating unit according to the present invention may alternatively be arranged in some other vehicle equipped with an engine. In such a case, a heating unit according to the present invention may be arranged at the upstream side or at the downstream side of a heater core that employs the engine cooling water as heat source as viewed in the air blowing direction and operated as auxiliary heating unit for heating blown air until the temperature of the cooling water rises to a predetermined level.

What is claimed is:

1. A heating unit of a vehicle heating system arranged in a blown air flow path for either internal air or external air to be blown into an inside of a vehicle in order to heat blown air, the heating unit comprising:

a casing made of a metal material capable of electromagnetically shielding microwaves and arranged in the blown air flow path, the casing having a hollow section with an upstream side aperture and a downstream side aperture as viewed in a flow direction of the blown air so as to allow the blown air to flow in and out through the casing;

a support arranged in the hollow section of the casing;

a plurality of microwave absorbing/heat emitting members arranged at the support at appropriate intervals, each of the plurality of microwave absorbing/heat emitting members having a hollow portion with an upstream side opening and a downstream side opening at opposite ends of the support as viewed in an air blowing direction; and a microwave outputting unit arranged in the casing to output microwaves toward the plurality of microwave absorbing/heat emitting members;

wherein the blown air is heated by heat generated as a result of absorption of the microwaves by the plurality of microwave absorbing/heat emitting members at a time the blown air flows from an upstream side to a downstream side in the hollow portions of the plurality of microwave absorbing/heat emitting members.

2. The heating unit of the vehicle heating system according to claim 1, wherein the heating unit is arranged in an air conditioning unit of a vehicle air conditioning system.

3. The heating unit of the vehicle heating system according to claim 1, wherein the heating unit is arranged in a part of a fan duct for flowing the blown air.

4. The heating unit of the vehicle heating system according to claim 1, wherein the support is made of a magnetically permeable ceramics material through which the microwaves can permeate and the plurality of microwave absorbing/heat emitting members are made of at least one of ferrite, Permalloy and oxidized slug.

5. The heating unit of the vehicle heating system according to claim 1, wherein the support is made of a heat-resistant synthetic resin material and the plurality of microwave absorbing/heat emitting members are made of at least one of ferrite, Permalloy and oxidized slug.

6. The heating unit of the vehicle heating system according to claim 1, wherein the support is formed by a metal member that reflects the microwaves and that has openings positionally agreeing with the hollow portions of the plurality of microwave absorbing/heat emitting members.

7. The heating unit of the vehicle heating system according to claim 6, wherein the plurality of microwave absorbing/heat emitting members are fitted to the metal made support so as to project to a side where the microwave outputting unit is arranged.

8. The heating unit of the vehicle heating system according to claim 1, wherein the plurality of microwave absorbing/heat emitting members are tubular members having axial lines agreeing with the air blowing direction and wherein axial ends of the tubular members project from both an upstream side surface and a downstream side surface of the support as viewed in the air blowing direction.

9. The heating unit of the vehicle heating system according to claim 1, wherein the support has a multiply-folded cooling water flow path formed in an inside thereof so as to allow cooling water to flow therethrough and make it possible to heat the cooling water along with the blown air flowing through the hollow portions of the plurality of microwave absorbing/heat emitting members.

10. The heating unit of the vehicle heating system according to claim 1, wherein the upstream side aperture and the downstream side aperture of the casing as viewed in the air blowing direction are provided with respective microwave shield members which have a plurality of openings and which are capable of electromagnetically shielding the microwaves.

11. The heating unit of the vehicle heating system according to claim 10, wherein each of the plurality of openings of the microwave shield members has an inner diameter not greater than $\frac{1}{4} \cdot \lambda$ of the microwaves.

* * * * *